US009834699B2

(12) United States Patent
Li et al.

(10) Patent No.: US 9,834,699 B2
(45) Date of Patent: Dec. 5, 2017

(54) COATING COMPOSITION

(71) Applicant: WATEVER INC., Waterloo (CA)

(72) Inventors: Xianguo Li, Waterloo (CA); Yongxin Wang, Waterloo (CA)

(73) Assignee: Watever Inc., Waterloo (CA)

( * ) Notice: Subject to any disclaimer, the term of this patent is extended or adjusted under 35 U.S.C. 154(b) by 145 days.

(21) Appl. No.: 14/408,121

(22) PCT Filed: Mar. 15, 2013

(86) PCT No.: PCT/CA2013/000254
§ 371 (c)(1),
(2) Date: Dec. 15, 2014

(87) PCT Pub. No.: WO2013/188947
PCT Pub. Date: Dec. 27, 2013

(65) Prior Publication Data
US 2015/0159037 A1 Jun. 11, 2015

Related U.S. Application Data

(60) Provisional application No. 61/661,433, filed on Jun. 19, 2012.

(51) Int. Cl.
| C09D 133/04 | (2006.01) |
| C08L 83/04 | (2006.01) |
| C09D 133/14 | (2006.01) |
| C09D 5/00 | (2006.01) |
| C03C 17/30 | (2006.01) |
| C09D 7/12 | (2006.01) |
| C08K 5/5435 | (2006.01) |

(52) U.S. Cl.
CPC ............ C09D 133/14 (2013.01); C03C 17/30 (2013.01); C09D 5/00 (2013.01); C09D 7/125 (2013.01); *C08K 5/5435* (2013.01); *Y10T 428/31612* (2015.04); *Y10T 428/31663* (2015.04)

(58) Field of Classification Search
USPC .......................................... 428/447; 524/588
See application file for complete search history.

(56) References Cited

U.S. PATENT DOCUMENTS

| 3,819,522 | A |   | 6/1974 | Zmoda et al. | |
| 4,026,826 | A | * | 5/1977 | Yoshida ................ | C08F 220/28 106/287.11 |
| 4,080,476 | A |   | 3/1978 | Laskey | |
| 4,467,073 | A |   | 8/1984 | Creasy | |
| 5,373,044 | A | * | 12/1994 | Adams ................... | C08F 220/04 524/379 |
| 5,451,460 | A |   | 9/1995 | Lu et al. | |
| 5,679,458 | A | * | 10/1997 | Cho ....................... | C08F 265/04 428/412 |
| 6,303,225 | B1 |   | 10/2001 | Veerasamy | |
| 6,354,296 | B1 |   | 3/2002 | Baumann et al. | |
| 6,582,839 | B1 |   | 6/2003 | Yamamoto et al. | |
| 7,455,519 | B1 |   | 11/2008 | Barstow | |
| 7,703,456 | B2 |   | 4/2010 | Yahiaoui et al. | |
| 8,648,211 | B2 |   | 2/2014 | Brook et al. | |
| 2003/0152763 | A1 |   | 8/2003 | Zhang et al. | |
| 2003/0212232 | A1 |   | 11/2003 | Majeti et al. | |
| 2004/0097680 | A1 |   | 5/2004 | Kilgour et al. | |
| 2005/0031857 | A1 |   | 2/2005 | Gau | |
| 2005/0266235 | A1 |   | 12/2005 | Nakajima et al. | |
| 2006/0246298 | A1 |   | 11/2006 | Wu | |
| 2007/0082210 | A1 |   | 4/2007 | Frediani | |
| 2008/0241520 | A1 |   | 10/2008 | Takahashi et al. | |
| 2009/0052070 | A1 |   | 2/2009 | Jardinet et al. | |
| 2009/0162668 | A1 |   | 6/2009 | Sharma et al. | |
| 2009/0246513 | A1 |   | 10/2009 | Laroche et al. | |
| 2010/0035069 | A1 |   | 2/2010 | Li et al. | |
| 2010/0304150 | A1 |   | 12/2010 | Zheng et al. | |
| 2011/0098206 | A1 |   | 4/2011 | Lynch et al. | |
| 2011/0170190 | A1 |   | 7/2011 | Simunic | |
| 2011/0180788 | A1 |   | 7/2011 | Chen et al. | |
| 2011/0250442 | A1 |   | 10/2011 | Castro et al. | |

FOREIGN PATENT DOCUMENTS

| CA | 2601529 | 9/2006 |
| CA | 2768309 | 2/2011 |
| CA | 2768311 | 2/2011 |
| CA | 2772309 | 3/2011 |
| CN | 1818004 A | 8/2006 |
| CN | 1990815 A | 7/2007 |
| CN | 101161756 A | 4/2008 |
| CN | 101788693 A | 7/2010 |
| EP | 0896229 A2 | 2/1999 |
| EP | 1099671 A1 | 5/2001 |

(Continued)

OTHER PUBLICATIONS

Briscoe et al., The Effect of Surface Fog on the Transmittance of Light, Solar Energy, 1991, pp. 191-197, vol. 46, No. 4, Pergamon Press plc, U.S.A.

(Continued)

*Primary Examiner* — Tae H Yoon
(74) *Attorney, Agent, or Firm* — Ridout & Maybee LLP (57) ABSTRACT

A coating composition is provided comprising a hydrophilic characteristic-effecting material compound. The production of the hydrophilic characteristic-effecting material compound is effected by admixing of operative starting materials. The operative starting materials include a superwetter material and an adhesion promoting agent material. The hydrophilic characteristic-effecting material compound includes a superwetter material-derived coating composition material fraction and an adhesion promoting agent material-derived coating composition material fraction. The adhesion promoting agent material-derived coating composition material fraction is configured for interacting with a substrate such that, in response to, at least, contacting between the coating composition and the substrate, adhesion of an operative surface material to the substrate is effected.

23 Claims, 1 Drawing Sheet

(56) References Cited

FOREIGN PATENT DOCUMENTS

| | | |
|---|---|---|
| EP | 1110993 A2 | 6/2001 |
| EP | 1325947 A2 | 7/2003 |
| EP | 2080740 A1 | 7/2009 |
| GB | 1158059 | 7/1969 |
| WO | 9618691 | 6/1996 |
| WO | 9723571 | 7/1997 |
| WO | 2003048048 A1 | 6/2003 |
| WO | 2004076566 A1 | 9/2004 |
| WO | 2009118415 A1 | 10/2009 |
| WO | 2011022827 A1 | 3/2011 |
| WO | 2011095626 A2 | 8/2011 |

OTHER PUBLICATIONS

Howarter et al., Self-Cleaning and Next Generation Anti-Fog Surfaces and Coatings, Macromolecular Rapid Communication, 2008, pp. 455-466, vol. 29, Issue 6, WILEY-VCH Verlag GmbH & Co. KGaA, Weinheim, Germany.

Wang et al. Light-induced amphiphilic surfaces, Nature, Jul. 31, 1997, pp. 431-432, vol. 388, Macmillan Publishers Ltd, United Kingdom.

Nikolov et al., Superspreading driven by Marangoni flow, Advances in Colloid and Interface Science, 2002, pp. 325-338, vol. 96, Elsevier Science B.V., Netherlands.

Anderson et al., The Role of Dynamic Surface Tension in Spray Droplet Retention, Proc. 10th Int. Congr. of Plant Protection, 1983, p. 576, 2.

Bayer, Adjuvants for Herbicides, Published by the Weed Science Society of America, 1982, Chapter 2.

WIPO; International Preliminary Report on Patentability dated Dec. 31, 2014 issued in corresponding International Application No. PCT/CA2013/000254; 6 pages.

International Search Report issued in PCT/CA2013/000254 dated Jul. 9, 2013; 6 pages.

Written Opinion of the International Search Authority issued in PCT/CA2013/000254 dated Jul. 9, 2013; 4 pages.

Njobuenwu, Derrick Ovunda, "Spreading of Trisiloxanes EO3 and EO9 Polyethylene Oxide Surfactant over Hydrophobic Substrates", 10 pages, http://ljs.academicdirect.org/A10/153_164.htm.

Venzmer, Joachim et al., "Trisiloxane Surfactants—Mechanisms or Spreading and Wetting", Pesticide Formulations and Application Systems: 18th Volume, ASTM STP 1347, J.D. Nalewaja, G.R. Goss, and R.S. Tann, Eds., American Society for Testing and Materials, 1998.

Hill, Randal M., "Superspreading", Thermodynamic and Theoretical Aspects, pp. 247-254.

Kabalnov, A., "Thermodynamics of Superspreading", The European Physical Journal, Eur. Phys. J. E 2, 255-264 (2000).

\* cited by examiner

COATING COMPOSITION

TECHNICAL FIELD

This disclosure relates to a coating composition and use of the coating composition for effecting production of a hydrophilic surface material.

BACKGROUND

Deposition of very small water droplets on solid surface, resulting in "fogging", may cause inconvenience and, in some circumstances, create a safety hazard. Such fogging occurs on vehicular windshields, when vehicles are operated in cold and humid conditions. It also occurs on eye glasses, when a spectacled person enters a warm house from a colder outdoor environment in the winter, or from an air-conditioned building to the warm outdoor environment in the summer. Bathroom mirrors become fogged while someone is taking a hot shower. Moreover fogging of swimming goggles, in a hot food showcase, or in a greenhouse, windows of buildings, trains, ships, spacecraft, night vision goggles, or anywhere else where a viewing surface is involved, such as military sighting/aiming equipment and instruments, compromise safety or impair efficiency. In this respect, an anti-fogging solution, to address these problems, would be embraced by a relatively large market.

Fog generally occurs when a mirror surface crosses areas with a relatively large temperature gradient, resulting in the condensation of vapour to form tiny liquid droplets on the surface. When the surface contact angle of these droplets is higher than 40°, visible light is reflected and refracted, leading to the consequent reduction of transmission and reflection of visible lights (B. J. Briscoe, K. P. Galvin, Sol. Energy 1991, 46, 191). To mitigate this situation, there are two approaches. The first approach is to treat the surface to render such surface more hydrophobic, so that tiny water droplets do not adhere to such surface. Unfortunately, present techniques are relatively uneconomical and do not work particularly well with tiny droplets. The second approach is to decrease the water contact angle on the subject surface. With this approach, ideally, the water droplets completely spread and form a uniform thin film over the surface. Compared with the first approach, this one is widely studied and many methods have been developed including coating the surface with surfactants, hydrophilic polymers and salts with certain photo effect. As a result, the generally accepted anti-fogging strategy is to efficiently increase the surface free energy of substrates so that water can spread over them.

Song describes a windshield anti-fogging agent that mainly contains sodium dodecyl sulphate, sodium alkyl sulfosuccinate, methyl ethyl glycol, isopropanol, dodecanol, ethylene glycol, trihydroxyethyl methyl amonium methosulfate, sodium benzoate, flavouring essence and water (G. Song, 2007, CN 1990815A). This formulation is relatively inexpensive and can be easily applied. In order to extend the working period of anti-fogging coatings, Gao and co-inventors in-situ polymerize hydrophilic polymers with hydroxyl or amino group on the surface of glass. They have also mixed $Al_2O_3$, $SiO_2$ and $ZrO_2$ into the final coating to improve the coating's abrasive resistance. However, they also acknowledge that the coating requires to be cured under 100-180° C. for 0.5-5 hours (J. Gao, H. Yang, 2006, CN 1818004A). Aine coated a resin lens with a complex of fatty acid amide and block copolymer of EO-PO (ethylene oxide and propylene oxide) (H. Aine, 2008, CN101161756A). Zhang and Liu applied a self-assembly method to react hydrophilic trialkoxy-3-aminosilane with hydroxyl groups on quartz or optical glass (J. Zhang, X. Liu, 2010, CN 101788693A). This method requires pre-acidulating the substrates to produce hydroxyl groups. Chen coated resin lens with polysiloxane (2 wt %) and water soluble polyurethane (58 wt %) to produce an anti-fogging surface (M. Chen, 2003, EP 1325947A2). Youngblood and co-workers used a layer-by-layer method to graft fluorine based surfactants on the surface of silicon wafer to produce anti-fogging surface, and the water contact angle on the coated surface was about 20° (J. A. Howarter, J. P. Youngblood, Macromol. Rapid Commun., 2008, 29, 455-466). Heberger and co-inventors pre-coated substrates with a polymer base, and then coated fluorine based surfactants and copolyester binders to produce anti-fogging coatings (J. M. Heberger et al, 2001, EP 1110993 A2).

Aside from the above-described methods, another approach to producing an anti-fogging coating is to coat glass surface with special metallic oxides possessing photo-effect, e.g. $TiO_2$. Wanatabe and co-workers studied the wettability transferring of $TiO_2$ under UV irradiation (R. Wang, K. Hashimoto, A. Fujishima, et al, Nature, 1997, 388, 431). They found that the water contact angle on a $TiO_2$ multi-crystal film could decrease from 72° to 0° after UV irradiation.

This technique has also been applied for anti-fogging coatings (P. K. Sharma, V. S. Veerasamy, 2009, EP 2080740 A1; Z. Zhang, T. Sakakibara, M. Yamada, Y. Kotani, 2003, US2003152763A1). Since this technique is influenced by UV irradiation, an improvement is to combine $TiO_2$ with hydrophilic polymers, or to produce high water retention coating on the substrates. However, $TiO_2$ is relatively expensive. According to ICIS data, the price of $TiO_2$ powder is around $2,535-2,600/ton in Asia by May of 2010, which is an increase of 8.3-15.2% over the price at the beginning of that year. The same cost issue is also surrounded with fluorine based surfactants mentioned earlier.

SUMMARY

In one aspect, there is provided a coating composition comprising a hydrophilic characteristic-effecting material compound, wherein the production of the hydrophilic characteristic-effecting material compound is effected by admixing of operative starting materials, wherein the operative starting materials include a superwetter material and an adhesion promoting agent material, wherein the hydrophilic characteristic-effecting material compound includes a superwetter material-derived coating composition material fraction and an adhesion promoting agent material-derived material fraction, the adhesion promoting agent material-derived coating composition material fraction being configured for interacting with a substrate such that, in response to, at least, contacting between the coating composition and the substrate, adhesion of an operative surface material to the substrate is effected.

In another aspect, there is provided a coating composition comprising a hydrophilic characteristic-effecting material, wherein the production of the hydrophilic characteristic-effecting material is effected by admixing of operative starting materials, wherein the operative starting materials include a superwetter material and an adhesion promoting agent material, wherein the hydrophilic characteristic-effecting material includes a superwetter material-derived coating composition material fraction and an adhesion promoting agent material-derived material fraction, the adhesion promoting agent material-derived material fraction being configured for interacting with a substrate such that, in response to, at least, contacting between the coating composition and the substrate, adhesion of an operative surface material to the substrate is effected, wherein the operative surface material includes superwetter material-derived surface material and a spacer material portion, wherein the spacer material portion is disposed between at least a spaced-apart fraction of the superwetter material-derived surface material and the substrate for effecting spaced-apart disposition of the at least a spaced-apart fraction of the superwetter material-derived surface material relative to the substrate.

In another aspect, there is provided a coating composition comprising a hydrophilic characteristic-effecting material, wherein the production of the hydrophilic characteristic-effecting material is effected by admixing of operative starting materials, wherein the operative starting materials include a superwetter material, an adhesion promoting agent material, and an operative solvent material, wherein the hydrophilic characteristic-effecting material includes a superwetter material-derived coating composition material fraction and an adhesion promoting agent material-derived material fraction, the adhesion promoting agent material-derived coating composition material fraction being configured for interacting with a substrate such that, in response to, at least, contacting between the coating composition and the substrate, adhesion of an operative surface material to the substrate is effected.

In another aspect, there is provided a coating composition comprising a hydrophilic characteristic-effecting material, wherein the production of the hydrophilic characteristic-effecting material is effected by admixing of operative starting materials, wherein the operative starting materials include a superwetter material and an adhesion promoting agent material, wherein the hydrophilic characteristic-effecting material includes a superwetter material-derived coating composition material fraction and an adhesion promoting agent material-derived material fraction, the adhesion promoting agent material-derived coating composition material fraction being configured for interacting with a substrate such that, in response to, at least, contacting between the coating composition and the substrate, adhesion of an operative surface material to the substrate is effected, wherein the operative surface material is hydrophilic.

In another aspect, there is provided a coating composition-applied article comprising an operative surface material that is adhered to a substrate, wherein the operative surface material includes a superwetter material-derived surface material.

In another aspect, there is provided a coating composition-applied article comprising an operative surface material that is adhered to a substrate, wherein the adhesion of the operative surface material to the substrate has been effected by contacting of the coating composition with the substrate, wherein the coating composition includes a hydrophilic characteristic-effecting material, wherein the production of the hydrophilic characteristic-effecting material is effected by admixing of operative starting materials, wherein the operative starting materials include a superwetter material and an adhesion promoting agent material, wherein the hydrophilic characteristic-effecting material includes a superwetter material-derived coating composition material fraction and an adhesion promoting agent material-derived coating composition material fraction, the adhesion promoting agent material-derived coating composition material fraction being configured for interacting with the substrate such that, in response to, at least, the contacting between the coating composition and the substrate, adhesion of the operative surface material to the substrate is effected, and wherein the operative surface material is hydrophilic.

In another aspect, there is provided a coating composition-applied article comprising an operative surface material that is adhered to a substrate, wherein the adhesion of the operative surface material to the substrate has been effected by contacting of the coating composition with the substrate, wherein the coating composition includes a hydrophilic characteristic-effecting material, wherein the production of the hydrophilic characteristic-effecting material is effected by admixing of operative starting materials, wherein the operative starting materials include a superwetter material and an adhesion promoting agent material, wherein the hydrophilic characteristic-effecting material includes a superwetter material-derived coating composition material fraction and an adhesion promoting agent material-derived coating composition material fraction, the adhesion promoting agent material-derived coating composition material fraction being configured for interacting with the substrate such that, in response to, at least, the contacting between the coating composition and the substrate, adhesion of the operative surface material to the substrate is effected, and wherein the operative surface material includes a superwetter material-derived surface material and a spacer material portion, wherein the spacer material portion is disposed between at least a spaced-apart fraction of the superwetter material-derived surface material and the substrate for effecting spaced-apart disposition of the at least a spaced-apart fraction of the superwetter material-derived surface material relative to the substrate.

In another aspect, there is provided a coating composition-applied article comprising an operative surface material that is adhered to a substrate, wherein the adhesion of the operative surface material to the substrate has been effected by contacting of the coating composition with the substrate, wherein the coating composition includes a hydrophilic characteristic-effecting material, wherein the production of the hydrophilic characteristic-effecting material is effected by admixing of operative starting materials, wherein the operative starting materials include a superwetter material and an adhesion promoting agent material, wherein the hydrophilic characteristic-effecting material includes a superwetter material-derived coating composition material fraction and an adhesion promoting agent material-derived coating composition material fraction, the adhesion promoting agent material-derived coating composition material fraction being configured for interacting with the substrate such that, in response to, at least, the contacting between the coating composition and the substrate, adhesion of the operative surface material to the substrate is effected, and wherein the contacting of the coating composition with the substrate is effected by, at least, applying the coating composition over a substrate surface material of the substrate, and the substrate surface material of the substrate is relatively less hydrophilic than the operative surface material whose adhesion to the substrate is effected by, at least, the contacting of the coating composition with the substrate.

BRIEF DESCRIPTION OF THE DRAWINGS

The composition of the preferred embodiments of the invention will now be described with the following accompanying drawings.

DETAILED DESCRIPTION

Unless stated otherwise, such as in the examples, all amounts and numbers used in this specification are intended to be interpreted as modified by the term "about". Likewise, all compounds or elements identified in this specification, unless stated otherwise, are intended to be non-limiting and representative of other compounds or elements generally considered by those skilled in the art as being within the same family of compounds or elements.

The term "associated" and grammatical variations thereof include any type of interaction, including chemical bonds (for example, covalent, ionic and hydrogen bonds) and/or Van der Waals forces, and/or polar and non-polar interactions through other physical constraints provided by molecular structure, and interactions through physical mixing.

Figure 1:
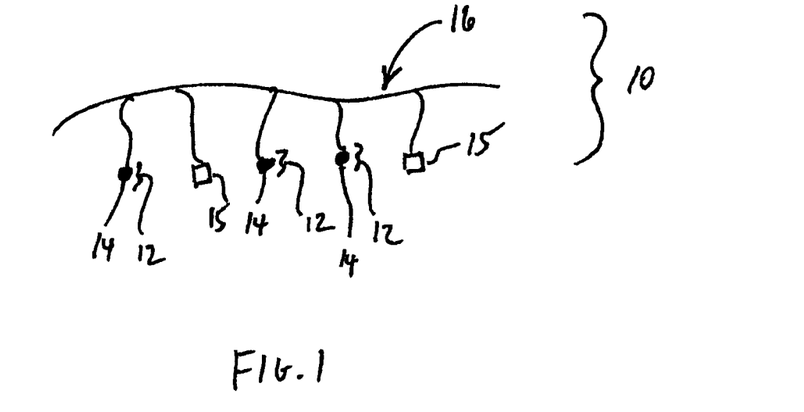
FIG. 1 is an illustration of a hydrophilic characteristic-effecting material of the coating composition.

Referring to FIG. 1, there is provided a coating composition comprising a hydrophilic characteristic-effecting material 10. The production of the hydrophilic characteristic-effecting material 10 is effected by admixing of operative starting materials, wherein the operative starting materials include a superwetter material and an adhesion promoting agent material.

The superwetter material is defined by one or more superwetters (or "super wetting agents" or "superspreaders").

In some embodiments, for example, a superwetter is configured such that, upon addition to water (hereinafter, the "untreated water"), production of a superwetter-treated water is effected, and the surface tension of the superwetter-treated water is less than the surface tension of the untreated water. In this respect, the superwetter-treated water is better able to spread over hydrophobic surfaces than the untreated water. In some embodiments, for example, the surface tension between ambient air at 20 degrees Celsius and a superwetter-treated water including 0.1 weight % superwetter, based on the total weight of the superwetter-treated water, is less than the surface tension between ambient air at 20 degrees Celsius and the untreated water.

In some embodiments, for example, the surface tension between ambient air at 20 degrees Celsius and a superwetter-treated water including 0.1 weight % superwetter, based on the total weight of the superwetter-treated water, is less than 25 mN/m. In some embodiments, for example, the surface tension between ambient air at 20 degrees Celsius and a superwetter-treated water including 0.1 weight % superwetter, based on the total weight of the superwetter-treated water, is less than 20 mN/m. In some embodiments, for example, the surface tension between ambient air at 20 degrees Celsius and a superwetter-treated water including 0.1 weight % superwetter, based on the total weight of the superwetter-treated water, is less than 16 mN/m. In some embodiments, for example, the surface tension between ambient air at 20 degrees Celsius and a superwetter-treated water including 0.1 weight % superwetter, based on the total weight of the superwetter-treated water, is 16 mN/m.

In some embodiments, for example, a superwetter is configured such that, upon addition to water, production of a superwetter-treated water is effected, and, under the same environmental conditions, the wetting area of a volume of superwetter-treated water deposited on the polystyrene Petri dish is over 100 times greater than the wetting area of an equivalent volume of untreated water deposited on the polystyrene Petri dish. In some embodiments, the wetting area of a volume of superwetter-treated water deposited on the polystyrene Petri dish is over 150 times greater than the wetting area of an equivalent volume of untreated water deposited on the polystyrene Petri dish. In some embodiments, the wetting area of a volume of superwetter-treated water deposited on the polystyrene Petri dish is over 200 times greater than the wetting area of an equivalent volume of untreated water deposited on the polystyrene Petri dish.

In some embodiments, for example, the superwetter is an organosilicone surfactant. In some embodiments, for example, the organosilicone surfactant is a trisiloxane based derivative. In some embodiments, for example, the organosilicone surfactant is a carbosilane derivative.

Exemplary superwetters include those of the Dow Corning™ brand Superwetter family, such as Dow Corning™ Q2-5211, Dow Corning™ 67 Additive, Dow Corning™ 500 W Additive, Dow Corning™ 501 Additive, and Dow Corning™ 502 W Additive, all of which are manufactured by Dow Corning.

Exemplary superwetters also include the Silwet™ super-spreaders manufactured by Momentive Performance Materials Inc., such as Silwet™ 77, Silwet™ 401, and Silwet™ Hydrostable 212.

If applied to a substrate, it is believed that, for at least some superwetters, the probability of the application, of the superwetter (alone, without the benefit of any adhesion promoting agent material to associate with) to the substrate, effecting the production of a superwetter-treated substrate including an operative superwetter-derived surface material, which includes one or more portions of the superwetter, that is either: (i) physically adhered to the substrate, or (ii) chemically bonded to the substrate, is relatively low. When such operative superwetter-derived surface material would be physically adhered to the substrate, the physical adhesion is effected by surface forces that are acting between the operative superwetter-derived surface material and the substrate, and is effected in response to the contacting of the superwetter and the substrate, wherein the superwetter-derived surface material is the superwetter. When such operative superwetter-derived surface material would be chemically bonded to the substrate, the chemical bonding is effected by a reactive process that is effected in response to the contacting of a substrate-reactive fraction of the superwetter with a superwetter-reactive fraction of the substrate.

Without wishing to be bound by theory, it is believed that this low probability, of the effecting of the production of an operative superwetter-derived surface material that is adhered to the substrate, is attributable to the relatively short length of the superwetter, and that this relatively short length renders the superwetter relatively inflexible. Because of this relative inflexibility, it is difficult for the superwetter to conform its shape so as to enable sufficiently close approach of any substrate-interactive functional group of the superwetter towards a correspondingly superwetter-interactive functional group of the substrate (with which the substrate-interactive functional group is configured to interact with to effect the adhesion of the operative superwetter-derived surface material to the substrate), so as to effect a process (chemical, physical, or otherwise) that effects the production of the operative superwetter-derived surface material.

Even if, for at least some superwetters, the production of the operative superwetter-derived surface material is effected, it is believed that the produced operative superwetter-derived surface material, because of its relatively short length, is unlikely to influence the surface tension between a water droplet and air, that becomes disposed on the superwetter-treated substrate, so as to promote the wettability of the water droplet disposed on the superwetter-treated substrate.

In some embodiments, for example, the adhesion promoting agent material is defined by one or more adhesion promoting compounds.

Figure 2:
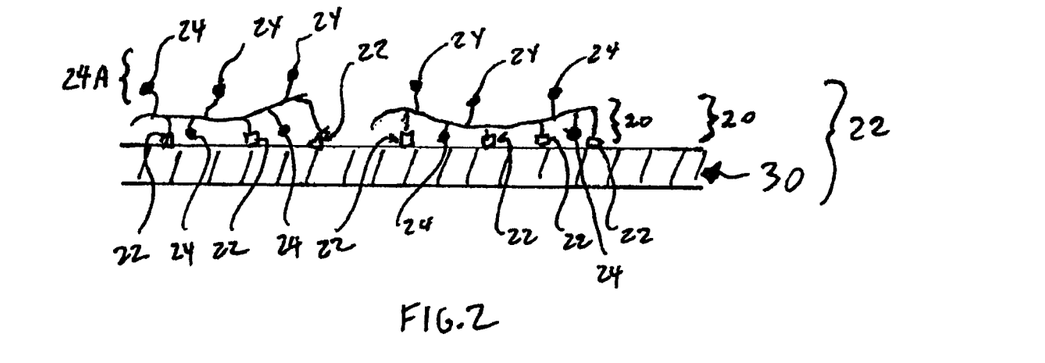
FIG. 2 is an illustration of a treated substrate including the operative surface material.

In some embodiments, for example, the adhesion promoting agent material is non-rigid. In some embodiments, for example, the adhesion promoting agent material is relatively flexible, so as to facilitate the effect of the production of the operative surface material 20 which is adhered to the substrate 30.

In some embodiments, for example, adhesion promoting agent material includes macromolecule-comprising material, such as polymeric material. In some embodiments, for example, the polymeric material includes at least one polymer. In some of these embodiments, for example, the at least one polymer is polarized. In some of these embodiments, for example, the at least one polymer is weakly polarized.

In some embodiments, for example, the polymeric material of the adhesion promoting agent material includes an operative polymer, and the operative polymer includes a structural unit (or recurring unit) having the structural formula (1), as follows:

(1)

wherein $R^1$ is either: (i) a hydrogen atom, or (ii) a monovalent organic group having 1 to 10 carbon atoms in total;
wherein $R^2$ is a divalent organic group having 1 to 12 carbon atoms in total;
wherein $R^3$ is a monovalent organic group having 1 to 15 carbon atoms in total;
wherein $R^4$ is a monovalent organic group having 1 to 15 carbon atoms in total; and
wherein $R^5$ is a monovalent organic group having 1 to 15 carbon atoms in total.

With respect to $R^1$, in some embodiments for example, $R^1$ has 0 to 4 carbon atoms in total. If $R^1$ has an excessive number of carbon atoms, the monomer from which the recurring unit is derived is more difficult to polymerize. When $R^1$ is a monovalent organic group, the monovalent organic group may be substituted or unsubstituted, and may be saturated or unsaturated, and may be linear, branched or cyclic, and may include one or more heteroatoms. In some embodiments, for example, the monovalent organic group is a monovalent hydrocarbon group. In some embodiments, for example, the monovalent hydrocarbon group is an aliphatic group. In some embodiments, for example, the aliphatic group is a linear aliphatic group. In some embodiments, for example, the aliphatic group is an alkyl group.

With respect to $R^2$, in some embodiments, for example, $R^2$ has 1 to 10 carbon atoms in total. In some embodiments, for example, $R^2$ has either 3 or 4 carbon atoms in total. If $R^2$ has an excessive number of carbon atoms, the polymer is more difficult to dissolve. If $R^2$ has an insufficient number of carbon atoms, the recurring unit has less mobility. When $R^2$ is a divalent organic group, the divalent organic group may be substituted or unsubstituted, and may be saturated or unsaturated, and may be linear, branched or cyclic, and may include one or more heteroatoms. In some embodiments, for example, the divalent organic group is a divalent hydrocarbon group. In some embodiments, for example, the divalent hydrocarbon group is an aliphatic group. In some embodiments, for example, the aliphatic group is a linear aliphatic group. In some embodiments, for example, the aliphatic group is an alkylene group.

With respect to $R^3$, in some embodiments, for example, $R^3$ has 1 to 6 carbon atoms in total. In some embodiments, for example, $R^3$ has 1 to 3 carbon atoms in total. If $R^3$ has an excessive number of carbon atoms, the polymer is more difficult to dissolve. When $R^3$ is a monovalent organic group, the monovalent organic group may be substituted or unsubstituted, and may be saturated or unsaturated, and may be linear, branched or cyclic, and may include one or more heteroatoms. In some embodiments, for example, the monovalent organic group is a monovalent hydrocarbon group. In some embodiments, for example, the monovalent hydrocarbon group is an aliphatic group. In some embodiments, for example, the aliphatic group is a linear aliphatic group. In some embodiments, for example, the aliphatic group is an alkyl group.

With respect to $R^4$, in some embodiments, for example, $R^4$ has 1 to 6 carbon atoms in total. In some embodiments, for example, $R^4$ has 1 to 3 carbon atoms in total. If $R^4$ has an excessive number of carbon atoms, the polymer is more difficult to dissolve. When $R^4$ is a monovalent organic group, the monovalent organic group may be substituted or unsubstituted, and may be saturated or unsaturated, and may be linear, branched or cyclic, and may include one or more heteroatoms. In some embodiments, for example, the monovalent organic group is a monovalent hydrocarbon group. In some embodiments, for example, the monovalent hydrocarbon group is an aliphatic group. In some embodiments, for example, the aliphatic group is a linear aliphatic group. In some embodiments, for example, the aliphatic group is an alkyl group.

With respect to $R^5$, in some embodiments, for example, $R^5$ has 1 to 6 carbon atoms in total. In some embodiments, for example, $R^5$ has 1 to 3 carbon atoms in total. If $R^5$ has an excessive number of carbon atoms, the polymer is more difficult to dissolve. When $R^5$ is a monovalent organic group, the monovalent organic group may be substituted or unsubstituted, and may be saturated or unsaturated, and may be linear, branched or cyclic, and may include one or more heteroatoms. In some embodiments, for example, the monovalent organic group is a monovalent hydrocarbon group. In some embodiments, for example, the monovalent hydrocarbon group is an aliphatic group. In some embodiments, for example, the aliphatic group is a linear aliphatic group. In some embodiments, for example, the aliphatic group is an alkyl group.

In some embodiments, for example, the number of occurrences of the recurring unit, having the structural formula (1), within the polymer is at least 1,000. In some embodiments, for example, the number of occurrences of the recurring unit, having the structural formula (1), within the polymer is at least 2,500. In some embodiments, for example, the number of occurrences of the recurring unit, having the structural formula (1), within the polymer is at least 5,000. In some embodiments, for example, the number of occurrences of the recurring unit, having the structural formula (1), within the polymer is between 5,000 and 10,000.

In some embodiments, for example, the operative polymer has the structural formula (2):

wherein $R^7$ is a hydrogen atom or a monovalent organic group;
and wherein $R^8$ is a hydrogen atom or a monovalent organic group;
and wherein Q represents $-\!\!+\!P\!\!-\!\!\!+_N$;
and wherein P, in each occurrence, independently, is A or $R^6$, and wherein A has the structural formula (2a):

wherein each one of $R^1$, $R^2$, $R^3$, $R^4$ and $R^5$ is the same as the corresponding $R^1$, $R^2$, $R^3$, $R^4$ and $R^5$ in formula (1a);
and wherein $R^6$ is a divalent organic group;
and wherein N is an integer that is greater than or equal to two;
with the proviso that Q has between two (2) and 10,000 units of A in total.

With respect to $R^6$, the divalent organic group of $R^6$ may be substituted or unsubstituted, and may include one or more heteroatoms, and may be saturated or unsaturated, and may be linear, branched or cyclic. In some embodiments, for example, the divalent organic group is a divalent hydrocarbon group. In some embodiments, for example, the divalent hydrocarbon group is an aliphatic group. In some embodiments, for example, the aliphatic group is a linear aliphatic group. In some embodiments, for example, the aliphatic group is an alkylene group.

In some embodiments, for example, Q has at least 1,000 units of A in total. In some embodiments, for example, Q has at least 2,500 units of A in total. In some embodiments, for example, Q has at least 5,000 units of A in total. In some embodiments, for example, Q has between 5,000 and 10,000 units of A in total.

In some embodiments, for example, the weight average molecular weight of the operative polymer of the adhesion promoting agent material is between 5,000 g/mol and 200,000 g/mol. In some embodiments, for example, the average molecular weight of the operative polymer of the adhesion promoting agent material is 85,000 g/mol.

In some embodiments, for example, the superwetter material includes an adhesion promoting agent material-associable fraction, and the adhesion promoting agent material includes a superwetter material-associable fraction. In some embodiments, for example, the adhesion promoting agent material-associable fraction includes one or more material portions, and the superwetter material-associable fraction includes one or more material portions. In response to, at least, the admixing, the adhesion promoting agent material-associable fraction interacts with the superwetter material-associable fraction so as to effect production of the hydrophilic characteristic-effecting material 10.

As above-described, the superwetter material includes one or more superwetters. In this respect, in such embodiments, each one of the one or more superwetters, independently, includes a respective superwetter-defined adhesion promoting agent material-associable fraction configured for interacting with the superweter material-associable fraction so as to effect production of the hydrophilic characteristic-effecting material, such that one or more superwetter-defined adhesion promoting agent material-associable fractions are defined. In some embodiments, for example, the superwetter-defined adhesion promoting agent material-associable fraction includes one or more material portions. In this respect, in such embodiments, the adhesion promoting agent material-associable fraction of the superwetter material is defined by the one or more superwetter-defined superwetter material-associable fractions.

In those embodiments where the adhesion promoting agent material is defined by one or more adhesion promoting compounds, each one of the one or more adhesion promoting compounds, independently, includes a respective adhesion promoting compound-defined superwetter material-associable fraction, such that one or more adhesion promoting compound-defined superwetter material-associable fractions are defined. In some embodiments, for example, the adhesion promoting compound-defined superwetter material-associable fraction includes one or more material portions. In this respect, in such embodiments, the superwetter material-associable fraction of the adhesion promoting agent material is defined by the one or more adhesion promoting compound-defined superwetter material-associable fractions.

In some embodiments, for example, the adhesion promoting agent material-associable fraction of the superwetter material includes an adhesion promoting agent material-reactive fraction, and the superwetter material-associable fraction of the adhesion promoting agent material includes a superwetter material-reactive fraction. The adhesion promoting agent material-reactive fraction is configured for participating in a reactive process with the superwetter material-reactive fraction within the reaction zone, in response to, at least, the admixing of the operative starting materials within the reaction zone (including the superwetter material and the adhesion promoting agent material), such that at least a fraction of the superwetter material-derived coating composition material fraction is associated with at least a fraction of the adhesion promoting agent material-derived material fraction by chemical bonding.

In some embodiments, for example, the adhesion promoting agent material-reactive fraction includes one or more reactive groups, each of which is, independently, selected from a siloxane (Si—OR) group, a vinyl group, an allyl group (or other unsaturated organic group), a hydroxyl group, an alkoxy group, an amino group, a cyano group, and an isocyano group.

In some embodiments, for example, the superwetter material-reactive fraction includes one or more reactive groups, each of which is, independently, selected from a siloxane (Si—OR) group, an amino group, a hydroxyl group, an active hydrogen group (ie. a functional group, that includes an hydrogen atom, and from which such hydrogen atom can be easily abstracted), a cyano group, an isocyano group, and an unsaturated organic group.

In some embodiments, for example, the adhesion promoting agent material includes polyisocyanates. One or more isocyano groups of a polyisocyanate are configured to react with a respective hydroxyl group of the superwetter material within the reaction zone, in response to, at least, the admixing of the operative starting materials within the reaction zone, to effect chemical bonding between the superwetter material-derived coating composition material fraction and the adhesion promoting agent material-derived material fraction.

In some embodiments, for example, the superwetter material-derived coating composition material fraction is associated with the adhesion promoting agent material-derived material fraction, and at least a fraction of the association between the superwetter material-derived material fraction and the adhesion promoting agent material-derived fraction is effected by at least one reactive process effected within the reaction zone, in response to, at least, the admixing of the operative starting materials (including the adhesion promoting agent material and the superwetter material) within the reaction zone. In some embodiments, for example, each one of the at least one reactive process is, independently, selected from an addition reaction, a substitution reaction, and a condensation reaction.

An exemplary reactive process is hydrolysis effected between a hydroxyl group of a superwetter material and a siloxane (Si—OR) group of an adhesion promoting agent material.

In some embodiments, for example, the superwetter material includes 3-[hydroxyl(polyethyleneoxy)propyl]-heptamethyltrisiloxane which includes one or more hydroxyl groups, each of which is configured to undergo a hydrolysis reaction with a respective siloxane (Si—OR) group of the adhesion promoting agent material within the reaction zone, in response to, at least, the admixing of the adhesion promoting agent and the superwetter material within the reaction zone, such that the at least one reactive process effected in response to, at least, the admixing of the operative starting materials within the reaction zone, includes the hydrolysis reaction, and such that the at least one or more reactive groups of the adhesion promoting agent material-reactive fraction includes the hydroxyl group and the at least one or more reactive groups of the superwetter material-reactive fraction includes the siloxane (Si—OR) group.

In some embodiments, for example, the adhesion promoting agent material has one or more isocyano groups, each of which is configured for reacting with a respective hydroxyl group of the superwetter material within the reaction zone, in response to, at least, the admixing of the adhesion promoting agent and the superwetter material within the reaction zone, such that the at least one reactive process is effected in response to, at least, the admixing of the operative starting materials within the reaction zone, and such that the at least one or more reactive groups of the adhesion promoting agent material-reactive fraction includes the isocyano group and the at least one or more reactive groups of the superwetter material-reactive fraction includes the hydroxyl group.

In other embodiments, for example, the superwetter material has one or more unsaturated carbon-carbon bonds, and the adhesion promoting agent material has one or more unsaturated carbon-carbon bonds, such that a polymerization reaction is effected within the reaction zone in response to, at least, the admixing of the adhesion promoting agent material and the superwetter material within the reaction zone, such that the at least one reactive process effected in response to, at least, the admixing of the operative starting materials within the reaction zone, includes the polymerization reaction, and such that the at least one or more reactive groups of the adhesion promoting agent material-reactive fraction includes the carbon atoms of the one or more unsaturated carbon-carbon bonds and the at least one or more reactive groups of the superwetter material-reactive fraction include the carbon atoms of the one or more unsaturated carbon-carbon bonds.

In some embodiments, for example, the superwetter material has one or more Si—H moieties, each of which is configured for reacting with a respective pair of carbon atoms of an unsaturated carbon-carbon bond of the adhesion promoting agent material within the reaction zone, in response to, at least, the admixing of the adhesion promoting agent material and the superwetter material within the reaction zone, such that the at least one reactive process effected in response to, at least, the admixing of the operative starting materials within the reaction zone, includes hydrosilation, and such that the at least one or more reactive groups of the adhesion promoting agent material-reactive fraction include the carbon atoms of the unsaturated carbon-carbon bond and the at least one or more reactive groups of the superwetter material-reactive fraction include the Si—H moiety.

The hydrophilic characteristic-effecting material 10 includes a superwetter material-derived coating composition material fraction and an adhesion promoting agent material-derived coating composition material fraction.

The superwetter material-derived coating composition material fraction is derived from the superwetter material. The superwetter material-derived coating composition material fraction includes one or more superwetter material-derived coating composition material portions 12. In some embodiments, for example, the one or more superwetter material-derived coating composition material portions include one or more trisiloxane moieties, derived from the superwetter material. In some embodiments, for example, a suitable trisiloxane moiety is any one of an ethylene oxide-modified trisiloxane moiety, a propylene oxide-modified trisiloxane moiety, or a trisiloxane moiety that is both ethylene oxide-modified and propylene oxide-modified (i.e. an ethylene oxide/propylene oxide-modified trisiloxane moiety, or an "EO-PO modified trisiloxane moiety"). In some embodiments, for example, the one or more superwetter material-derived coating composition material portions include one or more carbosilane moieties, derived from the superwetter material. In some embodiments, for example, a suitable carbosilane moiety is any one of an ethylene oxide-modified carbosilane moiety, a propylene oxide-modified carbosilane moiety, or a carbosilane moiety that is both ethylene oxide-modified and propylene oxide-modified (i.e. an ethylene oxide/propylene oxide—modified carbosilane moiety, or an "EO-PO modified carbosilane moiety").

The adhesion promoting agent material-derived coating composition material fraction is derived from the adhesion promoting agent material.

The adhesion promoting agent material-derived coating composition material fraction is configured for interacting with the substrate 30 such that, in response to, at least, contacting between the coating composition and the substrate 30, adhesion of an operative surface material 20 to the substrate 30 is effected. The operative surface material 20 is derived from the coating composition. The adhesion of the operative surface material 20 to the substrate 30 effects production of a coating composition-applied article 32, wherein the coating composition-applied article 32 includes the operative surface material 20. The adhesion of the operative surface material 20 to the substrate 30 would be effected by association between one or more substrate-associated operative surface material portions 22 and the substrate 30.

The contacting between the coating composition and the substrate 30 can be effected, for example, by application of the coating composition to the substrate, including by deposition of the coating composition on the substrate, or by coating of the substrate with the coating composition. The coating composition can also be applied to substrates by means of spraying, brushing, dipping or other suitable means.

Referring to FIG. 1, in some embodiments, for example, the configuration of the adhesion promoting agent material-derived coating composition material fraction, for the interacting with the substrate, is such that the adhesion promoting agent material-derived coating composition material fraction includes a substrate-interactive fraction 15, and the substrate interactive fraction 15 is configured for interacting with the substrate 30 such that, in response to, at least, the contacting between the coating composition and the substrate 30, the adhesion of the operative surface material 20 to the substrate 30 is effected. The substrate-interactive fraction 15 is derived from the adhesion promoting agent material in response to, at least, the admixing of the adhesion promoting agent material and the superwetter material. The substrate-interactive fraction 15 includes at least one or more substrate-interactive fraction-defined adhesion promoting agent material portions 16, each of which is defined by a respective adhesion promoting agent material portion (i.e. a material portion of the adhesion promoting agent material). In some embodiments, for example, the substrate-interactive fraction is defined by at least one or more substrate-interactive fraction-defined adhesion promoting agent material portions 16, each of which is defined by a respective adhesion promoting agent material portion. In this respect, the substrate-interactive fraction is defined by one or more portions of the adhesion promoting agent material.

In those embodiments where the adhesion promoting agent material is defined by one or more adhesion promoting compounds, in some of these embodiments, for example, each one of the one or more adhesion promoting compounds, independently, includes one or more adhesion promoting compound-defined interactive fractions, such that one or more adhesion promoting compound-defined interactive fractions are defined. In such embodiments, the substrate interactive fraction 15 (of the adhesion promoting agent material-derived coating composition material fraction) is defined by the one or more adhesion promoting compound-defined operative fractions.

In some embodiments, for example, the interaction with the substrate 30, for which the substrate interactive fraction 15 (of the adhesion promoting agent material-derived coating composition material fraction) is configured, in response to, at least, the contacting between the coating composition and the substrate 30, is a reactive process, such that the interaction effects a chemical bonding relationship between the substrate 30 and the operative surface material 20, such chemical bonding relationship including, for example, chemical bonding between the one or more substrate-associated operative surface material portions 22, of the operative surface material 20, and the substrate 30. In this respect, in some embodiments, for example, the substrate-interactive fraction 15 includes one or more substrate-reactive portions. The one or more substrate-reactive portions are configured to participate in a reactive process with the substrate 30 within the reaction zone, in response to, at least, the contacting of the coating composition with the substrate within the reaction zone, so as to effect the adhesion of the operative surface material 20 to the substrate 30. In some embodiments, for example, the one or more substrate-reactive portions are configured to participate in a reactive process with the substrate 30 within a reaction zone, in response to, at least, contacting of the coating composition with the substrate within the reaction zone, so as to effect the adhesion of at least a fraction of the one or more substrate-associated operative surface material portions 22 to the substrate 30, such that at least a fraction of the one or more substrate-associated operative surface material portions 22 are adhered to the substrate by chemical bonding.

In some embodiments, for example, each one of the one or more substrate-reactive portions is, independently, selected from a siloxane (Si—OR) group, a vinyl group, an allyl group (or other unsaturated organic group), a hydroxyl group, an alkoxy group, an amino group, a cyano group, and an isocyano group.

In some embodiments, for example, at least a fraction of the adhesion of the one or more substrate-associated operative surface material portions 22 to the substrate 30 is configured to be effected by at least one reactive process that is effected within a reaction zone, in response to, at least, the contacting of the coating composition with the substrate 30 within the reaction zone. In some embodiments, for example, each one of the at least one reactive process is, independently, selected from a hydrolysis reaction, an addition (or polymerization) reaction, or a nucleophilic substitution.

In some embodiments, for example, the substrate 30 is a resin substrate, and the surface of resin is configured to be modified by a reactive process such that a suitable functional group is grafted onto the surface and is available for participating in a reactive process with a siloxane group (Si—OR) of the adhesion promoting agent material-derived coating composition material fraction of the hydrophilic characteristic-effecting material 10 in a hydrolysis reaction within the reaction zone, in response to the contacting of the coating composition with the substrate 30 within the reaction zone, to thereby effect chemical bonding between the resin substrate 30 and the operative surface material 20, such that the reactive process includes the hydrolysis reaction, and such that the one or more substrate-reactive portions include the siloxane group (Si—OR).

In some embodiments, for example, the substrate 30 is a glass substrate and includes one or more hydroxyl groups that are available for participating in a reactive process with a siloxane group (Si—OR) of the adhesion promoting agent material-derived coating composition material fraction of the hydrophilic characteristic-effecting material 10 in a hydrolysis reaction within the reaction zone, in response to the contacting of the coating composition with the substrate 30 within the reaction zone, to thereby effect chemical bonding between the glass substrate and the operative surface material 20, such that the reactive process includes the hydrolysis reaction, and such that the one or more substrate-reactive portions include the siloxane group (Si—OR).

In some embodiments, for example, each one of the substrate 30, and the adhesion promoting agent material-derived coating composition material fraction of the hydrophilic characteristic-effecting material 10, includes unsaturated carbons that are available for participating in an addition reaction (or polymerization) within the reaction zone, in response to the contacting of the coating composition with the substrate 30 within the reaction zone, to thereby effect chemical bonding between the substrate 30 and the operative surface material 20, such that the reactive process includes polymerization, and such that the one or more substrate-reactive portions include unsaturated carbon atoms.

In some embodiments, for example, the adhesion promoting agent material-derived coating composition material fraction of the hydrophilic characteristic-effecting material 10 includes an isocyanol group and the substrate 30 includes a hydroxyl group (or an amino group), and these groups are configured for participating in a reactive process in the reaction zone in response to, at least, the contacting of the coating composition with the substrate 30 within the reaction zone, to thereby effect chemical bonding between the substrate 30 and the operative surface material 20, such that the reactive process includes nucleophilic substitutions, and such that the one or more substrate-reactive portions include the isocyanol group.

It is understood that one or more portions of the substrate 30 may become modified, (physically, or chemically, or both physically and chemically) in response to, at least, the contact engagement of the coating composition with the substrate. The term "substrate" is intended to cover the substrate prior to such contact engagement, as well as any modified form it assumes in response to such contact engagement. As well, the term "substrate surface material" is intended to cover the surface material of the substrate 30 prior to such contact engagement, as well as any modified form it assumes in response to such contact engagement.

Exemplary substrates 30 to which the coating composition may be applied include glass material and polymer (or resin) material. Exemplary glass materials include, but are not limited to, vehicular windshields and eye glasses, and dental mirrors or any other kind of glass materials which are susceptible to undesirable fogging. Exemplary resin materials include, but are not limited to, polymethylmethacrylate, polycarbon, polyether, polypropylene, polyethylene, and polyvinyl chloride.

In some embodiments, for example, the ratio of the weight of the superwetter material of the operative starting materials being admixed to the weight of the coating composition is between $1 \times 10^{-6}$ and 0.5. In some embodiments, for example, the ratio of the weight of the superwetter material of the operative starting materials being admixed to the weight of the coating composition is between $1 \times 10^{-3}$ and 0.1. In some embodiments, for example, the ratio of the weight of the superwetter material of the operative starting materials being admixed to the weight of the coating composition is between $1 \times 10^{-3}$ and 0.05.

In some embodiments, for example, the ratio of the weight of the adhesion promoting agent material of the operative starting materials being admixed to the weight of the coating composition is between $1 \times 10^{-6}$ and 0.5. In some embodiments, for example, the ratio of the weight of the adhesion promoting agent material of the operative starting materials being admixed to the weight of the coating composition is between $1 \times 10^{-3}$ and 0.1. In some embodiments, for example, the ratio of the weight of the adhesion promoting agent material of the operative starting materials being admixed to the weight of the coating composition is between $1 \times 10^{-3}$ and 0.05.

In some embodiments, for example, for the operative starting materials, the ratio of the weight of the adhesion promoting agent material to the weight of the superwetter material is between 10,000:1 and 1:1. In some embodiments, for example, for the operative starting materials, the ratio of the weight of the adhesion promoting agent to the weight of the superwetter material is between 10:1 and 2:1. In some embodiments, for example, for the operative starting materials, the ratio of the weight of the adhesion promoting agent to the weight of the superwetter material is between 5:1 and 2:1. In some of these embodiments, for example, this ratio is 10:1.

In some embodiments, for example, the coating composition further includes a catalyst material. The catalyst material is defined by one or more catalytic compounds. In some embodiments, for example, the catalytic compound is configured to function as a catalyst for effecting an increase to the rate at which the adhesion of the operative surface material 20 to the substrate 30 within the reaction zone is effected. In some embodiments, for example, the catalyst material includes an organotin compound. In some embodiments, for example, the catalyst material includes dibutyltin dilaurate.

In some embodiments, for example, the coating composition includes $1 \times 10^{-9}$ to 1 weight % of catalyst material, based on the total weight of the coating composition. In some embodiments, for example, the coating composition includes $1 \times 10^{-5}$ to 1 weight % of catalyst material, based on the total weight of the coating composition. In some embodiments, for example, the coating composition includes $2 \times 10^{-5}$ weight % of catalyst material, based on the total weight of the coating composition.

In some embodiments, for example, the coating composition may, but not necessarily, additionally include other materials, such as fillers, extenders, dispersants, pigments, and surfactants. In some of these embodiments, such other materials are present within the coating compositions in amounts that do not materially adversely affect the solubility of the operative polymer material within the operative.

In one aspect, the hydrophilic characteristic-effecting material 10 includes an operative compound, and the operative compound includes the superwetter material-derived coating composition material fraction and the adhesion promoting agent material-derived coating composition material fraction. In this respect, the superwetter material-derived coating composition material fraction is linked to the adhesion promoting agent material-derived coating composition material fraction by chemical bonding. In some embodiments, for example, superwetter material-derived coating composition material fraction is covalently linked (or, "covalently bonded") to the adhesion promoting agent material-derived coating composition material fraction. The hydrophilic characteristic-effecting material 10 includes a superwetter material-derived coating composition material fraction and an adhesion promoting agent material-derived coating composition material fraction. The adhesion promoting agent material-derived coating composition material fraction is configured for interacting with the substrate 30 such that, in response to, at least, contacting between the coating composition and the substrate 30, adhesion of an operative surface material 20 to the substrate is effected. The adhesion of the operative surface material 20 to the substrate 30 effects production of the coating composition-applied article 32. The coating composition-applied articles 32 include the operative surface material 20. The contacting between the coating composition and the substrate 30 can be effected, for example, by application of the coating composition to the substrate, including by deposition of the coating composition on the substrate, or by coating of the substrate with the coating composition.

In some embodiments, for example, the one or more superwetter material-derived coating composition material portions 12 of the superwetter material-derived coating composition material fraction, and the one or more substrate-interactive fraction-defined adhesion promoting agent material portions 16 of the adhesion promoting agent material-derived coating composition material fraction, are linked together by chemical bonding. In some of these embodiments, for example, the one or more superwetter material-derived portions 12 are covalently linked (or, "covalently bonded") to the one or more substrate-interactive fraction-defined adhesion promoting agent material portions 16.

In some embodiments, for example, the hydrophilic characteristic-effecting material 10 includes a macromolecule, such as a polymer, and the adhesion promoting agent material, from which the adhesion promoting agent material-derived material fraction is derived, includes macromolecule-comprising material, such as polymeric material, such as the exemplary materials described above.

In another aspect, the production of the hydrophilic characteristic-effecting material 10 is effected by admixing of operative starting materials, wherein the operative starting materials include a superwetter material, and an adhesion promoting agent material, and further includes an operative solvent material. The hydrophilic characteristic-effecting material 10 includes a superwetter material-derived coating composition material fraction and an adhesion promoting agent material-derived coating composition material fraction. The adhesion promoting agent material-derived coating composition material fraction is configured for interacting with the substrate 30 such that, in response to, at least, contacting between the coating composition and the substrate 30, adhesion of an operative surface material 20 to the substrate is effected. The adhesion of the operative surface material 20 to the substrate 30 effects production of the coating composition-applied article 32. The coating composition-applied article 32 includes the operative surface material 20. The contacting between the coating composition and the substrate 30 can be effected, for example, by application of the coating composition to the substrate, including by deposition of the coating composition on the substrate, or by coating of the substrate with the coating composition.

The operative solvent material is defined by one or more operative solvents. The operative solvent is configured to solubilize at least a fraction of any amount of the operative polymer material (in some embodiments, for example, substantially all of the operative polymer material is dissolved within the operative solvent material), as well as any other components that comprise the coating composition, and is provided for facilitating application of the coating composition to a substrate 30, as well as to facilitate mass transfer for enabling any interactions between the coating composition and the substrate, such as interactions between the substrate interactive fraction 15 and the substrate 30. In some embodiments, for example, the operative solvent material has a solvent polarity index of between two (2) and seven (7). In some embodiments, for example, each one of the one or more operative solvents has a solvent polarity index of between two (2) and seven (7).

In some embodiments, for example, the contact angle of the operative solvent, when disposed on the substrate, in ambient air, at a temperature of 20 degrees Celsius, at a pressure of one (1) atmosphere, and at a relative humidity of between 30% and 50%, is less than 10 degrees. In some embodiments, for example, the contact angle of the operative solvent, when disposed on the substrate, in ambient air, at 20 degrees Celsius, one (1) atmosphere, and at a relative humidity of between 30% and 50%, is less than 5 degrees. In some embodiments, for example, the contact angle of the operative solvent, when disposed on the substrate, in ambient air, at a temperature of 20 degrees Celsius, at a pressure of one (1) atmosphere, and at a relative humidity of between 30% and 50%, is zero degrees.

In some embodiments, for example, the operative solvent is configured to evaporate under ambient conditions.

In some embodiments, for example, the operative solvent is an organic solvent. In some embodiments, for example, exemplary solvents include any one of ethanol, isopropanol, acetone, ethyl acetate, tetrahydrofuran, xylenes, and toluene, or any combination thereof.

For some implementations, it is desirable to avoid using toxic organic solvents, and, in this respect, in some embodiments, for example, the operative solvent is an alcohol, such as ethanol. When at least a fraction of the operative solvent material is polarized, such as where the operative solvent material includes at least one alcohol, such as ethanol, the operative polymer of the hydrophilic characteristic-effecting material is polarized, and in some embodiments, weakly polarized, and is not completely non-polar.

In some embodiments, for example, the coating composition includes 50 to 99.9999 weight % of the operative solvent material, based on the total weight of the coating composition. In some embodiments, for example, the coating composition includes 90 to 99.999 weight % of the operative solvent material, based on the total weight of the coating composition. In some embodiments, for example, the coating composition includes 95 to 99.9 weight % of the operative solvent material, based on the total weight of the coating composition.

In some of these embodiments, the coating composition is a liquid solution including the admixture of the superwetter material and the adhesion promoting agent material In some embodiments, for example, the coating composition is a liquid ethanol solution whose production is effected by the admixing of the operative starting materials including the superwetter material and the adhesion promoting agent material, and the ratio of the weight of the adhesion promoting agent material of the operative starting materials being admixed (to effect production of the operative admixing product material) to the weight of the coating composition is 0.005, and the ratio of the weight of the superwetter material of the operative starting materials being admixed (to effect production of the operative admixing product material) to the weight of the coating composition is 0.003. In some of these embodiments, for example, the coating composition includes a catalyst, such as dibutyltin dilaurate, which effects acceleration of the reactive process or processes being effected between the coating composition and the substrate in response to, at least, the contact engagement between the coating composition and the substrate, and the concentration of dibutyltin dilaurate in the coating composition is between 5 and 10,000 ppm. In some embodiments, for example, the concentration of dibutyltin dilaurate in the coating composition is 20 ppm.

In another aspect, the adhesion promoting agent material-derived coating composition material fraction is configured for interacting with the substrate 30 such that, in response to, at least, contacting between the coating composition and the substrate 30, adhesion of an operative surface material 20 to the substrate 30 is effected, wherein the operative surface material 30 is hydrophilic.

In another aspect, the adhesion promoting agent material-derived coating composition material fraction is configured for interacting with the substrate 30 such that, in response to, at least, contacting between the coating composition and the substrate 30, adhesion of an operative surface material 20 to the substrate 30 is effected. The operative surface material 20 includes a superwetter material-derived surface material and a spacer material portion, wherein the spacer material portion is disposed between at least a spaced-apart fraction 24A of the superwetter material-derived surface material and the substrate for effecting spaced-apart disposition of the at least a spaced-apart fraction 24A of the superwetter material-derived surface material relative to the substrate. The spacer material portion 16 is derived from the adhesion promoting agent material (and is also, therefore, derived from the adhesion promoting agent material-derived coating composition material fraction of the coating composition). In this respect, the spacer material portion 16 includes one or more portions of the adhesion promoting agent material (and, therefore, includes one or more portions of the adhesion promoting agent material-derived coating composition material fraction of the coating composition). In some embodiments, for example, the spacer material portion 16 is linked to the superwetter material-derived surface material 24 by chemical bonding. In some embodiments, for example, the spacer material portion 16 is covalently linked (or, "covalently bonded") to the superwetter material-derived surface material 24. In some embodiments, for example, the at least a spaced-apart fraction 24A of the superwetter material-derived surface material 24 includes one or more coating composition-defined superwetter material-derived moieties that are derived from the superwetter material. In some embodiments, for example, the at least a spaced-apart fraction 24A includes one or more trisiloxane moieties, of the superwetter material. In some embodiments, for example, a suitable trisiloxane moiety is any one of an ethylene oxide-modified trisiloxane moiety, a propylene oxide-modified trisiloxane moiety, or a trisiloxane moiety that is both ethylene oxide-modified and propylene oxide-modified (i.e. an ethylene oxide/propylene oxide—modified trisiloxane moiety, or an "EO-PO modified trisiloxane moiety"). In some embodiments, for example, the at least a spaced apart fraction 24A includes one or more carbosilane moieties, of the superwetter material. In some embodiments, for example, a suitable carbosilane moiety is any one of an ethylene oxide-modified carbosilane moiety, a propylene oxide-modified carbosilane moiety, or a carbosilane moiety that is both ethylene oxide-modified and propylene oxide-modified (i.e. an ethylene oxide/propylene oxide—modified carbosilane moiety, or an "EO-PO modified carbosilane moiety").

In some embodiments, for example, contacting between the coating composition and the substrate 30 is effected, and production of a coating composition-applied article 32 is effected by such contacting. The contacting between the coating composition and the substrate 30 can be effected, for example, by application of the coating composition to the substrate, including by deposition of the coating composition on the substrate, or by coating of the substrate with the coating composition. The coating composition can also be applied to substrates by means of spraying, brushing, dipping or other suitable means.

In this respect, in another aspect, there is provided a method of production of a coating-composition-applied article, wherein the method includes applying any one of the embodiments of the coating composition, described above, to a substrate.

In some embodiments, for example, after the application of the coating composition, the applied coating composition is cured so as to effect production of the operative surface material 20. Curing includes evaporation of the solvent. In some embodiments, for example, the curing includes the supply of an artificial heat input. In some embodiments, for example, the curing is effected at a temperature between 10° C. and 200° C.

In another aspect, there is provided a coating-composition-applied article 32 whose production is effected by any one of the production methods, described above.

Referring to FIG. 2, the coating composition-applied article 32 includes an operative surface material 20, and the operative surface material 20 is adhered to the substrate 30. In some embodiments, for example, the operative surface material 20 is continuous. In some embodiments, for example, the operative surface material 20 is discontinuous. The adhesion of the operative surface material 20 to the substrate 30 is effected by association between one or more substrate-associated operative surface material portions 22 and the substrate 30. The one or more substrate-associated operative surface material portions 22 are derived from the interaction between the substrate interactive fraction 15 (of the adhesion promoting agent material-derived coating composition material fraction) and the substrate 30, such interaction being effected in response to, at least, the contacting between the coating composition and the substrate 30. In some embodiments, for example, the adhesion includes that effected by chemical bonding between the one or more substrate-associated operative surface material portions 22 and the substrate 30. In some embodiments, for example, the adhesion includes physical adhesion between the one or more substrate-associated operative surface material portions 22 and the substrate 30. In some embodiments, for example, the adhesion includes a combination of chemical bonding and physical adhesion between the one or more substrate-associated operative surface material portions 22 and the substrate 30.

In some embodiments, for example, the operative surface material 20 is substantially transparent by visual observation.

In another aspect, the operative surface material of the coating composition-applied article includes the superwetter material-derived surface material 24. The superwetter material-derived surface material 24 of the operative surface material 20 is derived from the coating composition. The superwetter material-derived surface material 24 includes at least a fraction of the superwetter material-derived coating composition material fraction of the hydrophilic characteristic-effecting material 10. In some embodiments, for example, the superwetter material-derived surface material 24 includes one or more coating composition-defined superwetter material-derived moieties that are derived from the superwetter material. In some embodiments, for example, the superwetter material-derived surface material 24 includes one or more trisiloxane moieties, of the superwetter material. In some embodiments, for example, a suitable trisiloxane moiety is any one of an ethylene oxide-modified trisiloxane moiety, a propylene oxide-modified trisiloxane moiety, or a trisiloxane moiety that is both ethylene oxide-modified and propylene oxide-modified (i.e. an ethylene oxide/propylene oxide—modified trisiloxane moiety, or an "EO-PO modified trisiloxane moiety"). In some embodiments, for example, the superwetter material-derived surface material 24 includes one or more carbosilane moieties, of the superwetter material. In some embodiments, for example, a suitable carbosilane moiety is any one of an ethylene oxide-modified carbosilane moiety, a propylene oxide-modified carbosilane moiety, or a carbosilane moiety that is both ethylene oxide-modified and propylene oxide-modified (i.e. an ethylene oxide/propylene oxide—modified carbosilane moiety, or an "EO-PO modified carbosilane moiety").

In another aspect, the operative surface material 20 of the coating composition-applied article 32 is hydrophilic. In some embodiments of this aspect, for example, the operative surface material 20 is configured for interacting with a water droplet disposed on the operative surface material 20, such that the contact angle of the operative surface material-disposed water droplet, in ambient air, at a temperature of 20 degrees Celsius, and at a pressure of one (1) atmosphere, and at a relative humidity of between 30% and 50%, is less than 90 degrees. In some embodiments, for example, this contact angle is less than 60 degrees. In some embodiments, for example, this contact angle is less than 10 degrees. In some embodiments, for example, this contact angle is less than 5 degrees.

In another aspect, contacting of the coating composition with the substrate 30 is effected by, at least, applying the coating composition over a substrate surface material of the substrate 30. The substrate surface material of the substrate 30 is relatively less hydrophilic than the operative surface material 20 whose adhesion to the substrate 30 is effected by, at least, the contacting of the coating composition with the substrate 30. In some embodiments, for example, the operative surface material 20 is configured for interacting with a water droplet disposed on the operative surface material 20, such that, under the same environmental conditions, the contact angle of the operative surface material-disposed water droplet is less than the contact angle of a water droplet disposed on the substrate surface material of the substrate 30.

In another aspect, the operative surface material 20 includes a superwetter material-derived surface material 24 and a spacer material portion 16, wherein the spacer material portion 16 is disposed between at least a spaced-apart fraction 24A of the superwetter material-derived surface material 24 and the substrate 30 for effecting spaced-apart disposition of the at least a spaced-apart fraction 24A of the superwetter material-derived surface material relative to the substrate 30. In some embodiments, for example, the spaced-apart fraction 24A includes one or more material portions. The spacer material portion 16 is derived from the adhesion promoting agent material (and is also, therefore, derived from the adhesion promoting agent material-derived coating composition material fraction of the coating composition). In this respect, the spacer material portion 16 includes one or more portions of the adhesion promoting agent material (and, therefore, includes one or more portions of the adhesion promoting agent material-derived coating composition material fraction of the coating composition). In some embodiments, for example, the spacer material portion 16 is linked to the superwetter material-derived surface material 24 by chemical bonding. In some embodiments, for example, the spacer material portion 16 is covalently linked (or, "covalently bonded") to the superwetter material-derived surface material 24. In some embodiments, for example, the at least a spaced-apart fraction 24A of the superwetter material-derived surface material 24 includes one or more coating composition-defined superwetter material-derived moieties that are derived from the superwetter material. In some embodiments, for example, the at least a spaced-apart fraction 24A includes one or more trisiloxane moieties, of the superwetter material. In some embodiments, for example, a suitable trisiloxane moiety is any one of an ethylene oxide-modified trisiloxane moiety, a propylene oxide-modified trisiloxane moiety, or a trisiloxane moiety that is both ethylene oxide-modified and propylene oxide-modified (i.e. an ethylene oxide/propylene oxide—modified trisiloxane moiety, or an "EO-PO modified trisiloxane moiety"). In some embodiments, for example, the at least a spaced apart fraction 24A includes one or more carbosilane moieties, of the superwetter material. In some embodiments, for example, a suitable carbosilane moiety is any one of an ethylene oxide-modified carbosilane moiety, a propylene oxide-modified carbosilane moiety, or a carbosilane moiety that is both ethylene oxide-modified and propylene oxide-modified (i.e. an ethylene oxide/propylene oxide—modified carbosilane moiety, or an "EO-PO modified carbosilane moiety").

Further embodiments will now be described in further detail with reference to the following non-limitative examples.

Example 1

Various coating compositions (AF1, AF2, AF3, AF4, AF5, AF6, AF7, and AF8) were prepared and tested to evaluate their efficacy at mitigating fogging of glass and plexiglass.

Adhesion promoting agents A1, A2, A3, and A4 were prepared as follows. 3-(trimethoxysilyl) propyl methacrylate has been admixed with a mixture of xylenes (o-xylene, m-xylene, and p-xylene) such that a solution of 10 weight % 3-(trimethoxysilyl) propyl methacrylate, based on the total weight of solution, has been prepared under stirring and protection of $N_2$. 0.5 weight % azobisisbutyronitrile, based on the total weight of the prepared solution, was then added to the prepared solution to initiate polymerization at 70° C. The reaction was permitted to occur over 36 hours to produce a reaction solution. The reaction solution was then rotevaporated to remove the solvent. A light yellow color liquid, poly(3-(trimethoxysily)propyl methacrylate) (A1) was then collected with a yield of 98% (i.e. two (2) weight % of the polymer A2 was removed with the solvent). Following the same method, poly(3-(triethoxysily)propyl methacrylate) (A2), poly(3-(tri(methoxyethoxysily)propyl methacrylate) (A3) and poly(3-(trimethylsiloxysilyl) propyl methacrylate) (A4) were prepared.

Superwetter materials B1 and B2 were selected: 3-[hydroxyl(polyethyleneoxy) propyl]-heptamethyltrisiloxane (90%, Gelest Inc.) (B1), 2-[methoxy(polyethyleneoxy) propyl]hepta-methyltrisiloxane, (tech-90, Gelest Inc.) (B2).

The spreading performance of B1 and B2 was measured and was found to be substantially the same. Each one of B1 and B2 was, independently, mixed into de-ionized water to form, respectively, a solution including 0.1 weight % of B1, based on the total weight of the solution, and a solution including 0.1 weight % of B2, based on the total weight of the solution. When one droplet of the solution was dropped on a Petri dish, its wetting area was 125 times larger relative to that formed by depositing one droplet of de-ionized water (untreated) on the Petri dish.

Each of the coating compositions AF1, AF3, AF5, and AF7 were prepared by mixing 0.1 to 15 parts by weight of a respective one of the adhesion promoting agents A1, A2, A3, A4, and 0.1 to 15 parts by weight of superwetter material B1, and 0 to 20 ppm dibutyltin dilaurate (Sigma-Aldrich Co. LLC., USA) into xylenes. After 3 hours, the solvent xylenes were replaced by ethanol. In this respect, the solution was firstly condensed by evaporating the solvent, xylenes, and then the condensed liquid was diluted in ethanol to a desired concentration.

Similarly, each of the coating compositions AF2, AF4, AF6, and AF8 were prepared by mixing 0.1 to 15 parts by weight of a respective one of the adhesion promoting agents A1, A2, A3, A4, and 0.1 to 15 parts by weight of superwetter material B2, and 0 to 20 ppm dibutyltin dilaurate (Sigma-Aldrich Co. LLC., USA) into xylenes. After 3 hours, the solvent xylenes were replaced by ethanol. In this respect, the solution was firstly condensed by evaporating the solvent, xylenes, and then the condensed liquid was diluted in ethanol to a desired concentration.

The coating compositions AF1, AF2, AF3, AF4, AF5, AF6, AF7, and AF8 are listed in Table 1.

TABLE 1

Formulations of coating compositions

|    | A1  | A2  | A3  | A4  |
|----|-----|-----|-----|-----|
| B1 | AF1 | AF3 | AF5 | AF7 |
| B2 | AF2 | AF4 | AF6 | AF8 |

Example 2

The performance of the coating compositions AF1, AF2, AF3, AF4, AF5, AF6, AF7, and AF8, that were prepared in Example 1, were tested.

Each of the coating compositions were sprayed on a respective transparent glass and a respective plexiglass. The surface was then polished using dry tissues so as to produce a sparkling appearance. The coated glass and plexiglass substrates were permitted to cure for one (1) hour to produce a cured composition.

Each of the coated substrates was then placed over a cup of warm water (30° C.) for 30 seconds. The degree of fogging was evaluated visually, and the results are illustrated in Table 2. "A" means see through and without dimension change of objects behind the glass. "B" means see through and with dimension change of objects behind the glass. "C" means the profile of objects behind the glass can be recognized. "D" means fogging and cannot see through.

TABLE 2

Fogging degree on glass and plexiglass exposed to 30° C. water.

|           | un-coated | AF1 | AF2 | AF3 | AF4 | AF5 | AF6 | AF7 | AF8 |
|-----------|-----------|-----|-----|-----|-----|-----|-----|-----|-----|
| Glass     | D         | A   | A   | A   | A   | A   | B   | B   | B   |
| Plexiglass| D         | A   | A   | A   | A   | A   | B   | C   | C   |

During this testing, no water film was visually observed on any of the coated glass or coated plexiglass.

Next, each of the coated substrates was placed over a cup of warmer water (60° C.) for 30 seconds. The degree of fogging was visually assessed, and the results are illustrated in Table 3.

TABLE 3

Fogging degree on glass and plexiglass exposed to 60° C. water.

|           | un-coated | AF1 | AF2 | AF3 | AF4 | AF5 | AF6 | AF7 | AF8 |
|-----------|-----------|-----|-----|-----|-----|-----|-----|-----|-----|
| Glass     | D         | A   | A   | A   | A   | A   | B   | C   | C   |
| Plexiglass| D         | A   | A   | A   | A   | A   | B   | C   | C   |

During this testing, no water film was visually observed on any of the coated glass or coated plexiglass.

Next, each of the coated substrates was placed over the cup of warmer water (60° C.), but the duration of exposure was extended to 60 seconds. In this case, uniform water films were visually observed on the glass and plexiglass substrates that were coated with AF1, AF2, AF3, AF4 and AF5. Only non-uniform water films were visually observed on the glass and plexiglass substrates that were coated with AF6, AF7 and AF8.

The AF3 coating composition was also tested on a bathroom mirror. The bathroom mirror was coated with AF3 and AF3 was permitted to cure. A hot shower was operated in the vicinity of the bathroom mirror for one (1) hour. No fogging was observed, and only a uniform water film was observed on the mirror, and images appearing in the mirror showed no dimension change.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A coating composition comprising a hydrophilic characteristic-effecting material compound, wherein the hydrophilic characteristic-effecting material compound is produced by the reaction of admixed operative starting materials, wherein the operative starting materials include:
    a superwetter material, wherein the superwetter material is at least one superwetter, wherein each one of the at least one superwetter, independently, is a superwetter that is disposed for admixing with water to obtain a superwetter-treated water including 0.1 weight % superwetter, based on the total weight of the superwetter-water admixture, wherein the superwetter-water admixture has surface tension less than 25 mN/m; and
    an adhesion promoting agent material, wherein the adhesion promoting agent material includes polymeric material;
wherein the hydrophilic characteristic-effecting material compound includes a superwetter material-derived coating composition material fraction and an adhesion promoting agent material-derived material fraction, wherein upon contact between the hydrophilic characteristic-effecting compound and a substrate, the adhesion promoting agent material-derived material fraction adheres to the substrate forming an operative surface material.

2. The coating composition as claimed in claim 1;
    wherein the superwetter material-derived coating composition material fraction is linked to the adhesion promoting agent material-derived coating composition material fraction by chemical bonding.

3. The coating composition as claimed in claim 1;
    wherein the operative surface material includes a superwetter material-derived surface material.

4. The coating composition as claimed in claim 1;
    wherein the operative surface material includes superwetter material-derived surface material and a spacer material portion, wherein the spacer material portion is disposed between the superwetter material-derived surface material and the substrate for effecting spaced-apart disposition of the superwetter material-derived surface material relative to the substrate.

5. The coating composition as claimed in claim 3; wherein the operative surface material includes one or more trisiloxane moieties, one or more carbosilane moieties, or any combination thereof.

6. The coating composition as claimed in claim 1; wherein the operative surface material is hydrophilic.

7. The coating composition as claimed in claim 1; wherein the operative surface material is substantially transparent by visual observation.

8. The coating composition as claimed in claim 1; further comprising an operative solvent material.

9. The coating composition as claimed in claim 1; wherein the polymeric material includes a polymer that includes a recurring unit having a structural formula (1):

wherein $R^1$ is either: (i) a hydrogen atom, or (ii) a monovalent organic group having 1 to 10 carbon atoms in total;
wherein $R^2$ is a divalent organic group having 1 to 12 carbon atoms in total;
wherein $R^3$ is a monovalent organic group having 1 to 15 carbon atoms in total;
wherein $R^4$ is a monovalent organic group having 1 to 15 carbon atoms in total; and
wherein $R^5$ is a monovalent organic group having 1 to 15 carbon atoms in total.

10. The coating composition as claimed in claim 1; further comprising catalyst material.

11. The coating composition as claimed in claim 10; wherein the catalyst material is present in an amount of $1 \times 10^{-9}$ to 1 weight %, based on the total weight of the coating composition.

12. The coating composition as claimed in claim 1; wherein the ratio of the weight of the superwetter material of the operative starting materials being admixed to the weight of the coating composition is between $1 \times 10^{-6}$ and 0.5.

13. The coating composition as claimed in claim 1; wherein the ratio of the weight of the superwetter material of the operative starting materials being admixed to the weight of the coating composition is between $1 \times 10^{-3}$ and 0.5.

14. The coating composition as claimed in claim 1; wherein the ratio of the weight of the superwetter material of the operative starting materials being admixed to the weight of the coating composition is between $1 \times 10^{-3}$ and 0.05.

15. The coating composition as claimed in claim 1; wherein the ratio of the weight of the adhesion promoting agent material of the operative starting materials being admixed to the weight of the coating composition is between $1 \times 10^{-6}$ and 0.5.

16. The coating composition as claimed in claim 1; wherein the ratio of the weight of the adhesion promoting agent material of the operative starting materials being admixed to the weight of the coating composition is between $1 \times 10^{-3}$ and 0.5.

17. The coating composition as claimed in claim 1; wherein the ratio of the weight of the adhesion promoting agent material of the operative starting materials being admixed to the weight of the coating composition is between $1 \times 10^{-3}$ and 0.05.

18. The coating composition as claimed in claim 1; wherein the ratio of the weight of the adhesion promoting agent material to the weight of the superwetter material is between 10,000:1 and 1:1.

19. The coating composition as claimed in claim 1; wherein the ratio of the weight of the adhesion promoting agent material to the weight of the superwetter material is between 10:1 and 2:1.

20. The coating composition as claimed in claim 1; wherein the ratio of the weight of the adhesion promoting agent material to the weight of the superwetter material is between 5:1 and 2:1.

21. The coating composition as claimed in claim 1; wherein the adhesion promoting agent material is defined by at least one adhesion promoting compound.

22. The coating composition as claimed in claim 1; wherein the substrate is a glass substrate or a resin substrate.

23. A coating composition-applied article comprising a substrate to which is adhered an operative surface material whose production is effected by, at least, contacting the coating composition of claim 1 with the substrate.

* * * * *